United States Patent
Mohr et al.

(10) Patent No.: US 11,108,058 B2
(45) Date of Patent: Aug. 31, 2021

(54) BIPOLAR PLATE AND FUEL CELL

(71) Applicant: Volkswagen AG, Wolfsburg (DE)

(72) Inventors: Philipp Mohr, Braunschweig (DE); Christian Martin Zillich, Braunschweig (DE)

(73) Assignee: Audi AG, Ingolstadt (DE)

( * ) Notice: Subject to any disclaimer, the term of this patent is extended or adjusted under 35 U.S.C. 154(b) by 686 days.

(21) Appl. No.: 15/302,567

(22) PCT Filed: Apr. 2, 2015

(86) PCT No.: PCT/EP2015/057362
§ 371 (c)(1),
(2) Date: Oct. 7, 2016

(87) PCT Pub. No.: WO2015/155125
PCT Pub. Date: Oct. 15, 2015

(65) Prior Publication Data
US 2017/0033373 A1    Feb. 2, 2017

(30) Foreign Application Priority Data
Apr. 7, 2014    (DE) .................... DE102014206682.4

(51) Int. Cl.
*H01M 8/026* (2016.01)
*H01M 8/0265* (2016.01)

(52) U.S. Cl.
CPC ......... *H01M 8/026* (2013.01); *H01M 8/0265* (2013.01)

(58) Field of Classification Search
None
See application file for complete search history.

(56) References Cited

U.S. PATENT DOCUMENTS

| | | | |
|---|---|---|---|
| 6,884,536 B1 | 4/2005 | Hatho et al. | |
| 8,785,068 B2 | 7/2014 | Ishida et al. | |
| 8,889,318 B2 | 11/2014 | Wagner et al. | |
| 2003/0219642 A1 | 11/2003 | Yang et al. | |

(Continued)

FOREIGN PATENT DOCUMENTS

| | | |
|---|---|---|
| DE | 10054444 B4 | 5/2001 |
| DE | 19945978 | 8/2001 |

(Continued)

*Primary Examiner* — Wyatt P McConnell
(74) *Attorney, Agent, or Firm* — Davidson, Davidson & Kappel, LLC

(57) ABSTRACT

A bipolar plate (100) for a fuel cell includes at least one profiled flow field (120) with at least two flow field channels (121, 122, 123, 124) and an associated inlet channel (111, 112, 113, 114) and an associated outlet channel (131, 132, 133, 134) for each of the flow field channels (121, 122, 123, 124). Here, different inlet channels (111, 112, 113, 114) are of different lengths, and different outlet channels (131, 132, 133, 134) are of different lengths. The bipolar plate (100) is characterized in that the inlet channels and/or the outlet channels (131, 132, 133, 134) are dimensioned in such a way that the pressure loss is equal via each channel which is composed of one of the flow field channels (121, 122, 123, 124), the associated inlet channel (111, 112, 113, 114) and the associated outlet channel (131, 132, 133, 134), as long as a predefined mass flow change takes place in each of the flow field channels (121, 122, 123, 124).

9 Claims, 6 Drawing Sheets

(56) References Cited

U.S. PATENT DOCUMENTS

| | | |
|---|---|---|
| 2004/0151954 A1 | 8/2004 | Ooma |
| 2005/0153184 A1 | 7/2005 | Beutel et al. |
| 2006/0115705 A1 | 6/2006 | Choi et al. |
| 2007/0092782 A1 | 4/2007 | Fuss |
| 2007/0202383 A1* | 8/2007 | Goebel ............... H01M 4/8605 429/444 |

FOREIGN PATENT DOCUMENTS

| | | |
|---|---|---|
| DE | 102006049907 | 5/2007 |
| DE | 102006005339 A1 | 8/2007 |
| DE | 102007008474 | 10/2007 |
| DE | 102008033210 | 1/2010 |
| JP | S62-163264 A | 7/1987 |
| JP | S64-63272 A | 3/1989 |
| JP | 2006-156398 A | 6/2006 |
| JP | 2006-190494 A | 7/2006 |
| JP | 2006-231205 A | 9/2006 |
| JP | 2006-344460 A | 12/2006 |
| JP | 2008-103241 A | 5/2008 |
| JP | 2010-506360 A | 2/2010 |
| JP | 2010-218973 A | 9/2010 |
| WO | WO2008/041994 | 4/2008 |
| WO | WO2008/050816 | 5/2008 |
| WO | WO2014026288 | 2/2014 |

* cited by examiner

BIPOLAR PLATE AND FUEL CELL

The present invention relates to a bipolar plate and a fuel cell, which includes at least one such bipolar plate.

BACKGROUND

Fuel cells use the chemical reaction of a fuel with oxygen to form water, in order to generate electrical energy. For this purpose, fuel cells contain, as the core component, the so-called membrane-electrode assembly (MEA), which is a composite made of an ion-conductive (usually proton-conductive) membrane and an electrode (anode and cathode) situated on either side of the membrane. In addition, gas diffusion layers (GDL) may be situated on both sides of the membrane-electrode assembly, on the sides of the electrodes facing away from the membrane. In general, the fuel cell is formed by a plurality of MEAs situated in a stack, the electrical powers of which are added together. In general, bipolar plates (also called flow field plates) are situated between the individual membrane-electrode assemblies, which ensure a supply of the individual cells with the operating media, i.e., the reactants, and are typically also used for cooling. In addition, the bipolar plates ensure an electrically conductive contact with the membrane-electrode assemblies.

During operation of the fuel cell, the fuel, in particular hydrogen H2 or a hydrogen-containing gas mixture, is supplied to the anode via a flow field of the bipolar plate open on the anode side, where an electrochemical oxidation of H2 to form H+ with the emission of electrons takes place. A (water-bound or water-free) transport of the protons H+ from the anode chamber into the cathode chamber takes place via the membrane, which separates the reaction chambers from one another in a gas-tight manner and electrically insulates them. The electrons provided at the anode are conducted via an electrical line to the cathode. Oxygen or an oxygen-containing gas mixture (e.g., air) is supplied to the cathode via a flow field of the bipolar plate open on the cathode side, so that a reduction of O2 to form O2− with absorption of the electrons takes place. At the same time, these oxygen anions react in the cathode chamber with the protons transported via the membrane to form water. Due to the direct conversion of chemical energy into electrical energy, fuel cells achieve an improved efficiency in relation to other electricity generators due to the avoidance of the Carnot factor.

The supply and removal of the operating media (fuel, oxygen, and coolant) takes place via inlet and outlet distribution structures. Two such distribution structures are associated with each flow field, which are used for the inlet and the outlet, respectively, of the particular operating means.

The flow field of a bipolar plate is typically formed in a plane in such a way that all flow field channels of the flow field have the same length. The flow field channels may have the same channel cross-sectional areas. This is described, for example, in the publication DE 10 2006 005 339 A1.

In addition, inlet channels and outlet channels typically have the same hydraulic diameter. Different flow field channels sometimes have inlet channels of different lengths and outlet channels of different lengths, however. To equalize the pressure losses, the total length of inlet channel and outlet channel is equal for each of the flow field channels, however. This total length is divided differently into inlet channel length and outlet channel length for different flow field channels.

Since thermal and/or chemical reactions of the particular operating medium partially occur in the flow field within the scope of the power generation, the mass flows of operating medium which pass by the inlet distribution structures are different from the mass flows of the reaction products and the remainder of the operating medium, which pass by the outlet distribution structures.

The mass flow change has the result that the pressure drop in a first flow field channel having a long inlet channel and a short outlet channel differs from the pressure drop in another, second flow field channel having a short inlet channel and a long outlet channel, also if the total length of the long inlet channel and the short outlet channel is equal to that of the short inlet channel and the long outlet channel and the inlet and outlet channels have the same hydraulic diameter, i.e., the same ratio of the flow-through channel cross-sectional area to the area wetted by the operating medium.

To compensate for the mass flow change in the flow field, the publication DE 100 54 444 B4 provides that the flow field channels have the same channel cross-sectional area change over the length of the flow field channel.

SUMMARY OF THE INVENTION

The present invention is based on the object of further equalizing the pressure losses across the entire flow field system including inlet and outlet distribution structures for all assembled channels.

The bipolar plate provided according to the present invention includes at least one profiled flow field having at least two flow field channels and, for each of the flow field channels, one associated inlet channel and one associated outlet channel, different inlet channels being of different lengths and different outlet channels being of different lengths. The bipolar plate is characterized in that the inlet channels and/or the outlet channels are dimensioned in such a way that the pressure loss is equal over each channel composed of the flow field channels, the associated inlet channel, and the associated outlet channel, if a predetermined mass flow change takes place in each of the flow field channels. This enables an optimized uniform distribution of the operating media during operation.

In one specific embodiment, the flow field channels may have an equal length and the assembled channels may have a further equal length. The inlet channels may have different lengths and the outlet channels may have different lengths. The inlet channels may have different hydraulic diameters, the hydraulic diameter of the inlet channels being the larger the longer the associated inlet channel is, so that the pressure loss over each of the assembled channels is equal.

Alternatively, the outlet channels have different hydraulic diameters, which are the smaller the longer the particular outlet channel is, if the same predetermined mass flow change takes place in each of the flow field channels.

The uniform distribution of the operating media during operation may thus be optimized while maintaining the relative arrangement of bipolar plate in relation to inlet and outlet main channels.

Alternatively, each of the outlet channels may have a first equal hydraulic diameter, each of the inlet channels may have a second equal hydraulic diameter, and each of the flow field channels may have a third equal hydraulic diameter. The assembled channels may then have different lengths, the lengths being selected in such a way that the pressure loss over each of the assembled channels is equal.

First angles between flow directions may be equal in each one of the flow field channels and the associated inlet channel, and second angles between flow directions in each one of the flow field channels and the associated outlet channel may be the smaller the longer the associated outlet channel is.

It is also possible that the first angles are the greater the longer the associated inlet channel is, and the second angles are equal.

These are possibilities for optimizing the uniform distribution of the operating media during the operation while maintaining the relative arrangement of bipolar plate in relation to inlet and outlet main channels.

Inlet openings of the flow field channels may be situated in succession on a first straight line. Outlet openings of the flow field channels may be situated on a second straight line, which is in parallel to the first straight line. Further inlet openings of the inlet channels may be situated on a third straight line, and further outlet openings of the outlet channels may be situated in succession on a fourth straight line, which is in parallel to the third straight line. The third and the fourth straight lines may be perpendicular to the first and the second straight lines.

If the flow field is designed as planar, the third and also the fourth straight lines may be perpendicular to a surface normal of the flow field.

Further preferred embodiments of the present invention may result from the remaining features.

The various specific embodiments of the present invention mentioned in this application are advantageously combinable with one another, if not indicated otherwise in the individual case.

BRIEF DESCRIPTION OF THE DRAWINGS

The present invention will be explained hereafter in exemplary embodiments on the basis of the associated drawings.

DETAILED DESCRIPTION

Figure 1:
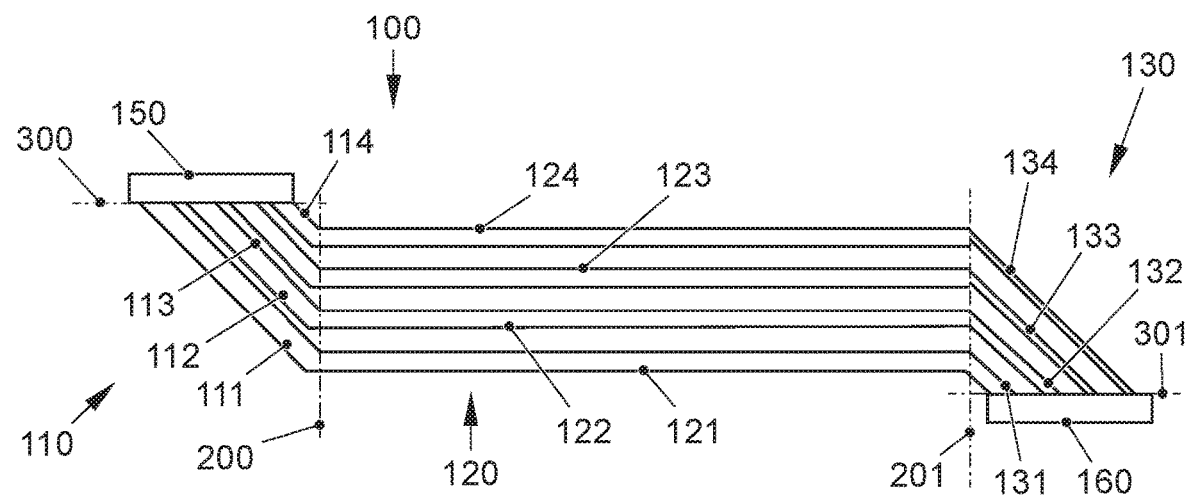
FIG. 1 schematically shows a first exemplary embodiment of a bipolar plate according to the present invention, FIG. 2 schematically shows a second exemplary embodiment of a bipolar plate according to the present invention, FIG. 3 schematically shows a third exemplary embodiment of a bipolar plate according to the present invention, FIG. 4 schematically shows a fourth exemplary embodiment of a bipolar plate according to the present invention, FIG. 5 schematically shows a fifth exemplary embodiment of a bipolar plate according to the present invention, and FIG. 6 schematically shows an exemplary embodiment of a fuel cell according to the present invention.

FIGS. 1 through 5 show exemplary embodiments of bipolar plate 100 according to the present invention. Bipolar plate 100 includes an inlet distribution structure 110, a flow field 120, and an outlet distribution structure 130. Flow field 110 includes flow field channels 121, 122, 123, 124. For each of flow field channels 121, 122, 123, 124, inlet distribution structure 110 includes an associated inlet channel 111, 112, 113, 114, via which particular flow field channel 121, 122, 123, 124 may be connected to an inlet main channel 150. Furthermore, outlet distribution structure 130 includes, for each of flow field channels 121, 122, 123, 124, an associated outlet channel 131, 132, 133, 134, via which particular flow field channel 121, 122, 123, 124 may be connected to an outlet main channel 160, which extends in parallel to inlet main channel 150 in the illustrated exemplary embodiments.

In the illustrated exemplary embodiments of the bipolar plate, the flow field is designed as planar, flow field channels 121, 122, 123, 124 extending from inlet openings to outlet openings. However, the present invention is not restricted thereto.

In the illustrated exemplary embodiments of the bipolar plate, precisely one flow field channel 121, 122, 123, 124 is associated with each inlet channel 111, 112, 113, 114, one flow field channel 121, 122, 123, 124 is also associated with each outlet channel 131, 132, 133, 134 in the example. However, the present invention is not restricted thereto. Multiple flow field channels may thus have the same associated inlet channel. Additionally or alternatively, multiple flow field channels may have the same associated outlet channel. If outlet channels and inlet channels are provided, which each supply or drain multiple flow field channels, they do not necessarily have to supply or drain the same multiple flow field channels.

Particular associated inlet channels 111, 112, 113, 114 to flow field channels 121, 122, 123, 124 adjoin the inlet openings, and particular associated outlet channels 131, 132, 133, 134 to flow field channels 121, 122, 123, 124 adjoin the outlet openings.

In the illustrated exemplary embodiments of the bipolar plate, the inlet openings are situated on a first straight line 200. The outlet openings are situated in the illustrated exemplary embodiments on a second straight line 201, which is in parallel to first straight line 200. Furthermore, inlet main channel 150 extends in the exemplary embodiments along a third straight line 300, which is perpendicular to the first straight line. In the exemplary embodiments, outlet channel 160 additionally extends along a fourth straight line 301, which is in parallel to the third straight line. However, the present invention is not restricted thereto.

Inlet main channel 150 and outlet main channel 160 also extend perpendicularly in relation to a surface normal of the flow field in the illustrated exemplary embodiments. However, the present invention is not restricted thereto.

In the illustrated exemplary embodiments of the bipolar plate, flow field channels 121, 122, 123, 124 all have the same length and the same hydraulic diameter. The mass flow changes in two different flow field channels 121, 122, 123, 124 are therefore essentially equal. However, the present invention is not restricted thereto. Each of inlet channels 111, 112, 113, 114, in contrast, has an individual length in the illustrated examples, which differs from the lengths of remaining inlet channels 111, 112, 113, 114. In contrast, in the illustrated examples, each of outlet channels 131, 132, 133, 134 also has an individual length, which differs from the lengths of remaining outlet channels 131, 132, 133, 134.

Figure 2:
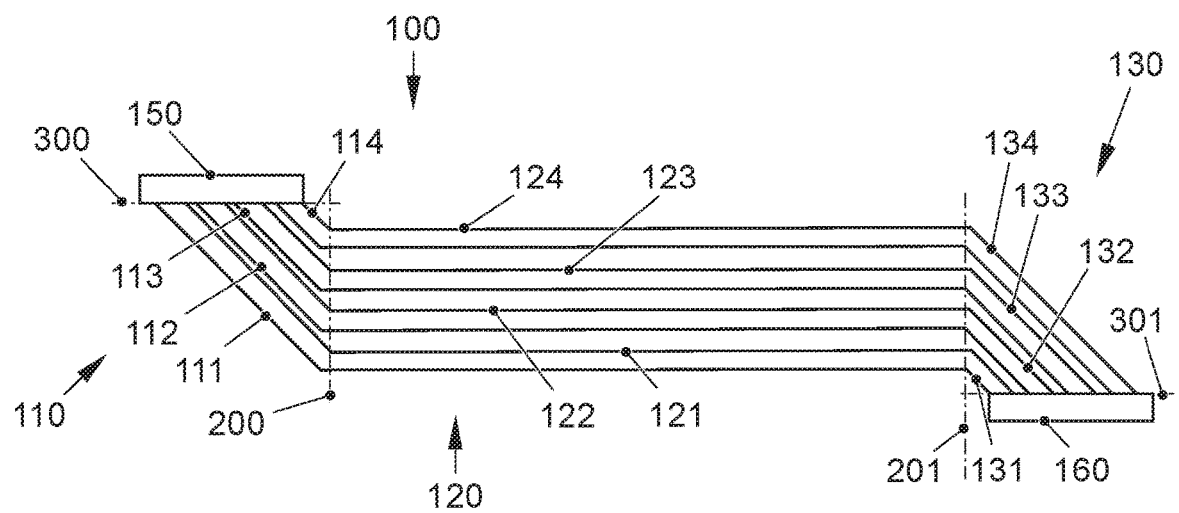
Figure 3:
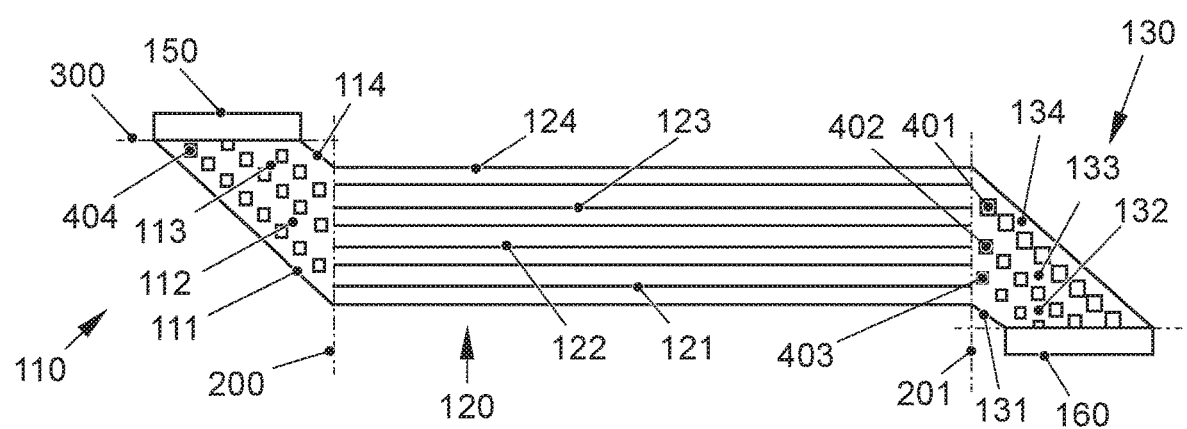

In the exemplary embodiments of the bipolar plate of FIGS. 1 through 3, each of inlet channels 111, 112, 113, 114 encloses an equal first angle with associated flow channel 121, 122, 123, 124. Each of outlet channels 131, 132, 133, 134 also encloses an equal second angle with associated flow field channel 121, 122, 123, 124. The assembled channels, which are assembled from inlet channels 111, 112, 113, 114, flow field channels 121, 122, 123, 124, and outlet channels 131, 132, 133, 134, thus have an equal total length.

In the exemplary embodiments of FIGS. 1 and 3, each of inlet channels 111, 112, 113, 114 has an equal hydraulic diameter. Each of outlet channels 131, 132, 133, 134, in contrast, has an individual hydraulic diameter, which differs from the hydraulic diameter of remaining outlet channels

131, 132, 133, 134. The individual hydraulic diameters of outlet channels 131, 132, 133, 134 are adapted to the individual channel lengths, so that the pressure loss in any arbitrary outlet channel 131, 132, 133, 134 in the case of a first mass flow is equal to the pressure loss in an inlet channel of equal length having the hydraulic diameter in the case of a second mass flow, the difference between the second and the first mass flow being equal to the mass flow reduction in flow field channel 121, 122, 123, 124 which is associated with particular outlet channel 131, 132, 133, 134.

A longer outlet channel 132, 133, 134 has a smaller individual hydraulic diameter than a shorter outlet channel 131, 132, 133.

In FIG. 1, the inlet channels are completely separated from one another. The outlet channels are also completely separated from one another.

In FIG. 3, in contrast, inlet channels 111, 112, 113, 114 are in communication with one another, i.e., there are one or multiple connections between two adjacent inlet channels 111, 112, 113, 114. Outlet channels 131, 132, 133, 134 are also in communication with one another. For this purpose, an inlet distribution structure 110 and an outlet distribution structure 130 are structured by groups of structural elements 401, 402, 403, 404. Structural elements which are associated with the same group are situated between each two of the inlet or outlet channels and are of equal size. In the exemplary embodiment according to FIG. 3, structural elements which are associated with the same group also have the same shape. However, the present invention is not restricted thereto. In inlet distribution structure 110 of the exemplary embodiment illustrated in FIG. 3, structural elements 404 of different groups do not differ, while structural elements 401, 402, 403 of different groups of outlet distribution structure 130 have different sizes. However, it is also possible that the structural elements of different groups of inlet distribution structure 110 have different sizes and different groups of outlet distribution structure 130 do not differ in size. Due to the different sizes of structural elements 401, 402, 403 of different groups in outlet distribution structure 130, outlet channels 131, 132, 133, 134 which are in communication with one another are implemented, whose hydraulic diameter is the smaller the longer particular outlet channel 131, 132, 133, 134 is. Or inlet channels in communication with one another are implemented, whose hydraulic diameter is the smaller the shorter the particular inlet channel is.

In the exemplary embodiments of FIG. 2, each of inlet channels 111, 112, 113, 114 has an individual hydraulic diameter, which differs from the hydraulic diameters of remaining inlet channels 111, 112, 113, 114. The hydraulic diameter is the smaller the shorter particular inlet channel 111, 112, 113, 114 is. In contrast, each of outlet channels 131, 132, 133, 134 has an equal hydraulic diameter.

Figure 4:
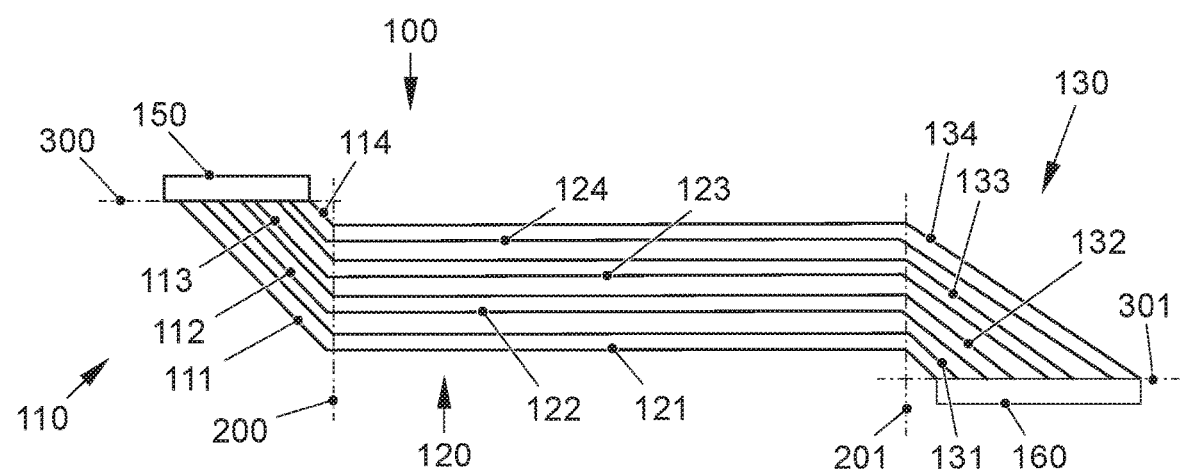
Figure 5:
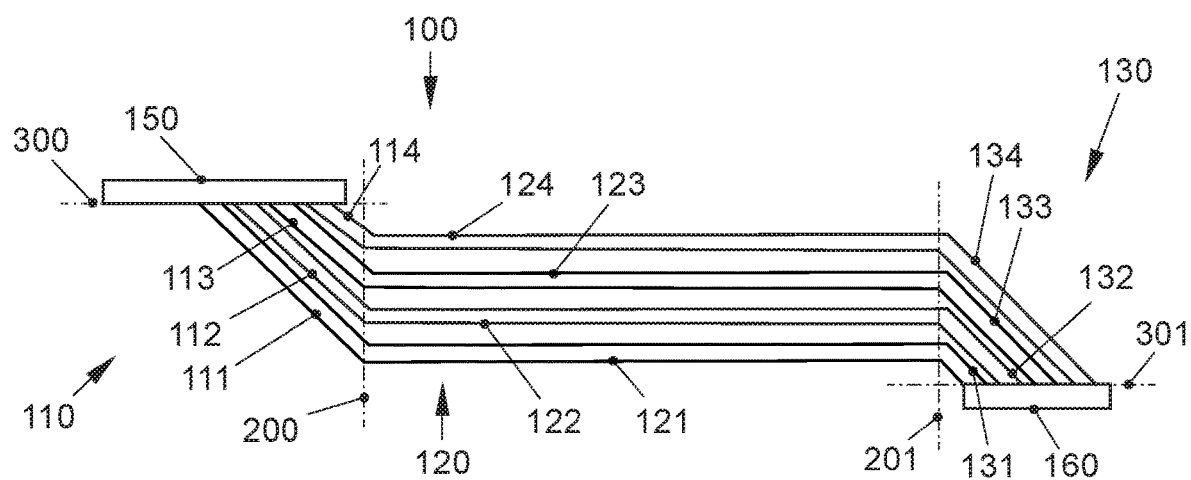

In the exemplary embodiments of FIGS. 4 and 5, the hydraulic diameter of various inlet channels 111, 112, 113, 114 is the same. Each of outlet channels 131, 132, 133, 134 also has an equal hydraulic diameter. In the exemplary embodiments of FIGS. 4 and 5, the hydraulic diameter of inlet channels 111, 112, 113, 114 is equal to the hydraulic diameter of outlet channels 131, 132, 133, 134. However, it is also possible that the hydraulic diameter of inlet channels 111, 112, 113, 114 differs from the hydraulic diameter of outlet channels 131, 132, 133, 134.

In the exemplary embodiments of FIGS. 1, 2, and 3, the length of each assembled channel, which results from one of inlet channels 111, 112, 113, 114, associated flow field channel 121, 122, 123, 124, and associated outlet channel 131, 132, 133, 134, is constant. However, the hydraulic diameters of inlet channels 111, 112, 113, 114 and/or outlet channels 131, 132, 133, 134 differ. In the exemplary embodiments of FIGS. 4 and 5, in contrast, the hydraulic diameters of outlet channels 131, 132, 133, 134 do not differ. The hydraulic diameters of inlet channels 111, 112, 113, 114 also do not differ from one another. However, the lengths of the assembled channels differ. An assembled channel is the longer the shorter the associated inlet channel is.

In FIG. 4, this is achieved in that a flow direction in inlet channels 111, 112, 113, 114 encloses an equal first angle with a flow direction in flow field channels 121, 122, 123, 124, while flow directions in each of outlet channels 131, 132, 133, 134 enclose individual second angles with the flow direction in flow field channels 121, 122, 123, 124, which are the greater the shorter associated inlet channel 111, 112, 113, 114 or the longer associated outlet channel 131, 132, 133, 134 is.

In FIG. 5, this is achieved in that flow directions in each of the inlet channels enclose individual first angles with the flow direction in flow field channels 121, 122, 123, 124, which are the greater the longer associated inlet channel 111, 112, 113, 114 or the shorter associated outlet channel 131, 132, 133, 134 is, while the flow direction in each of outlet channels 131, 132, 133, 134 encloses an equal second angle with the flow direction in flow field channels 121, 122, 123, 124.

An exemplary embodiment is not shown, in which both the inlet channels and the outlet channels are dimensioned differently from one another. In this exemplary embodiment, the dimensioning is also selected in such a way that the pressure loss is equal over each channel assembled from one of the flow field channels, the associated inlet channel, and the associated outlet channel, if a predetermined mass flow change takes place in each of the flow field channels. The inlet channels of this exemplary embodiment differ from one another in length and/or hydraulic diameter. The outlet channels of this exemplary embodiment also differ from one another in length and/or hydraulic diameter.

Figure 6:
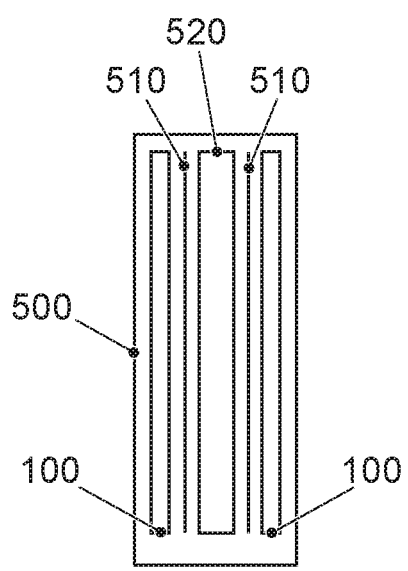

FIG. 6 shows a fuel cell corresponding to an exemplary embodiment of the present invention. Fuel cell 500 includes a membrane-electrode assembly (MEA) 520, which is situated between two gas diffusion layers (GDL) 510. The packet made of membrane-electrode assembly 520 between two gas diffusion layers 510 is situated between two bipolar plates 100 according to the present invention.

The present invention is industrially applicable in a variety of ways. For example, it may be used in mobile (for example, motor vehicle) and stationary devices (for example, block heating power plant), which convert chemical energy stored in fuel directly into electrical energy.

LIST OF REFERENCE NUMERALS

100 bipolar plate
110 inlet distribution structure
111, 112, 113, 114 inlet channels
120 flow field
121, 122, 123, 124 flow field channels
130 outlet distribution structure
131, 132, 133, 134 outlet channels
150 inlet main channel
160 outlet main channel
200 first straight line
201 second straight line
300 third straight line
301 fourth straight line
401, 402, 403, 404 structural elements 500 fuel cell
510 gas diffusion layer (GDL)
520 membrane-electrode assembly (MEA)

What is claimed is:

1. A bipolar plate comprising:
at least one profiled flow field including at least two flow field channels including a first flow field channel and a second flow field channel;
a first inlet channel and a first outlet channel associated with the first flow field channel to define a first assembled channel, and a second inlet channel and a second outlet channel associated with the second flow field channel to define a second assembled channel;
the first inlet channel having a different length than the second inlet channel and the first outlet channel having a different length than the second outlet channel;
the first and second inlet channels or the first and second outlet channels are dimensioned in such a way that the pressure loss of the first assembled channel and the second assembled channel is equal if a same predetermined mass flow change takes place in each of the first and second flow field channels;
the first and second assembled channels having an equal length, the first inlet channel having a hydraulic diameter differing from that of the second inlet channel or the first outlet channel having a hydraulic diameter differing from that of the second outlet channel;
wherein the first flow field channel connects solely to the first inlet channel at an inlet and solely to the first outlet channel at an outlet to define the first assembled channel and wherein the second flow field channel connects solely to the second inlet channel at a second inlet and solely to the second outlet channel at a second outlet to define the second assembled channel.

2. The bipolar plate as recited in claim 1 wherein the first and second flow field channels have an equal length, the first inlet channel being longer than the second inlet channel and having a larger hydraulic diameter than the second inlet channel.

3. The bipolar plate as recited in claim 1 wherein the first and second flow field channels have an equal length.

4. The bipolar plate as recited in claim 1 wherein first and second inlet openings of the first and second flow field channels, respectively, are situated in succession on a first straight line and first and second outlet openings of the first and second flow field channels, respectively, are situated in succession on a second straight line parallel to the first straight line, further inlet openings of the first and second inlet channels being situated on a third straight line, and further outlet openings of the first and second outlet channels being situated in succession on a fourth straight line parallel to the third straight line, the third and the fourth straight lines being perpendicular to the first and the second straight lines.

5. The bipolar plate as recited in claim 4 wherein the flow field is designed as planar and the third and the fourth straight lines are perpendicular to a surface normal of the flow field.

6. A fuel cell comprising:
at least one membrane-electrode assembly; and
at least one bipolar plate as recited in claim 1.

7. The bipolar plate as recited in claim 4 wherein the third and fourth lines are spaced apart from each other, the first and second flow field channels being located between the third and fourth lines.

8. The bipolar plate as recited in claim 4 wherein the first inlet channel has a same hydraulic diameter as the second inlet channel and the first outlet channel has a hydraulic diameter differing from that of the second outlet channel.

9. The bipolar plate as recited in claim 4 wherein the first inlet channel has a differing hydraulic diameter from that of the second inlet channel and the first outlet channel has a same hydraulic diameter as that of the second outlet channel.

* * * * *